(12) United States Patent
Stegemann et al.

(10) Patent No.: US 7,855,469 B2
(45) Date of Patent: Dec. 21, 2010

(54) CONDITION MONITORING SYSTEM FOR WIND TURBINE GENERATOR AND METHOD FOR OPERATING WIND TURBINE GENERATOR

(75) Inventors: Klaus Stegemann, Coesfeld (DE); Juergen Esser, Bevergen (DE); Hermann R. Fehrenbach, Ruelzheim (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/572,852

(22) Filed: Oct. 2, 2009

(65) Prior Publication Data

US 2010/0133828 A1 Jun. 3, 2010

(51) Int. Cl.
*F03D 9/00* (2006.01)
*H02P 9/04* (2006.01)
(52) U.S. Cl. .......................... 290/55; 290/44
(58) Field of Classification Search .............. 290/44, 290/55; 415/2.1, 4.2, 4.5; 60/398; 416/1, 416/132 B
See application file for complete search history.

(56) References Cited

U.S. PATENT DOCUMENTS

| | | | | |
|---|---|---|---|---|
| 4,083,651 | A | * | 4/1978 | Cheney et al. ............. 416/11 |
| 4,160,170 | A | | 7/1979 | Harner et al. |
| 4,161,658 | A | | 7/1979 | Patrick |
| 4,189,648 | A | | 2/1980 | Harner |
| 4,366,387 | A | * | 12/1982 | Carter et al. .............. 290/55 |
| 4,582,013 | A | * | 4/1986 | Holland, Jr. .............. 114/39.3 |
| 5,028,804 | A | | 7/1991 | Lauw |
| 5,234,315 | A | * | 8/1993 | Ogihara et al. ............ 415/16 |
| 5,289,041 | A | | 2/1994 | Holley |
| 5,546,793 | A | | 8/1996 | Gimmler et al. |
| 7,095,129 | B2 | | 8/2006 | Moroz |
| 7,118,339 | B2 | | 10/2006 | Moroz et al. |
| 7,321,822 | B2 | | 1/2008 | Schmidt et al. |
| 7,322,794 | B2 | * | 1/2008 | LeMieux et al. ........... 416/40 |
| 7,436,083 | B2 | * | 10/2008 | Shibata et al. ............ 290/44 |
| 2005/0129498 | A1 | * | 6/2005 | Brooks ..................... 415/1 |
| 2007/0018457 | A1 | | 1/2007 | Llorente Gonzalez |
| 2007/0025856 | A1 | * | 2/2007 | Moroz ................... 416/223 R |

(Continued)

FOREIGN PATENT DOCUMENTS

WO 2004051212 A1 6/2004

OTHER PUBLICATIONS

Kallenberger, C.; Hamedovic, H.; Zoubir, A.M., Evaluation of Torque Estimation Using Gray-box and Physical Crankshaft Modeling, ICASSP 2008, Mar. 31, 2008-Apr. 4, 2008, pp. 1529-1532 (4 pages), Corporate Research and Development Advance Engineering Systems, Robert Bosch GmbH, D-71701 Schwieberdingen, Germany.

(Continued)

*Primary Examiner*—Julio Gonzalez
(74) *Attorney, Agent, or Firm*—Armstrong Teasdale LLP (57) ABSTRACT

A method for operating a wind turbine generator includes generating at least one of a plurality of rotor shaft angular displacement values, a plurality of rotor shaft angular velocity signals, and a plurality of rotor shaft angular acceleration signals. The method also includes determining a torsional moment within a rotor shaft, and modulating at least one of a wind turbine generator yaw orientation and a blade pitch orientation as a function of the determined torsional moment.

18 Claims, 7 Drawing Sheets

U.S. PATENT DOCUMENTS

2009/0289460 A1* 11/2009 Bech .......................... 290/55
2010/0054941 A1* 3/2010 Hoffmann .................... 416/61

OTHER PUBLICATIONS

Hermann Fehrenbach, et al, Determining Engine Torque from the Engine-Speed Signal, MTZ Worldwide Dec. 2002, vol. 63, pp. 9-12 (4 pages), The Fraunhofer Institute for Information and Data Processing—IITB, IAV GmbH, ATZ online.

Magnus Hellstrom, Engine Speed Based Estimation of the Indicated Engine Torque, Master's Thesis performed at Vehicular Systems, Department of Electrical Engineering at Linkopings University, Feb. 16, 2005, 54 pages.

* cited by examiner

CONDITION MONITORING SYSTEM FOR WIND TURBINE GENERATOR AND METHOD FOR OPERATING WIND TURBINE GENERATOR

BACKGROUND OF THE INVENTION

The subject matter described herein generally relates to wind turbine generators and, more particularly, to a method and condition monitoring system for facilitating operation of wind turbine generators.

At least some known wind turbine generators include a rotor having multiple blades. The rotor is sometimes coupled to a housing, or nacelle, that is positioned on top of a base, for example, a truss or tubular tower. At least some known utility grade wind turbines (i.e., wind turbines designed to provide electrical power to a utility grid) have rotor blades having predetermined shapes and dimensions. The rotor blades transform mechanical wind energy into induced blade lift forces that further induce a mechanical rotational torque that drives one or more generators via a drive train that includes a rotor shaft, subsequently generating electric power. The generators are sometimes, but not always, rotationally coupled to the rotor shaft through a gearbox. The gearbox steps up the inherently low rotational speed of the rotor shaft for the generator to efficiently convert the rotational mechanical energy to electrical energy, which is fed into the electric utility grid. Gearless direct drive wind turbine generators also exist.

During operation of such known wind turbine generators, the rotor may experience a mass imbalance, thereby inducing increased loads on the rotor and other drive train components. Also, the rotor's position with respect to the wind may induce increased loads on the rotor and other drive train components.

BRIEF DESCRIPTION OF THE INVENTION

In one aspect, a method for operating a wind turbine generator is provided. The method includes generating at least one of a plurality of rotor shaft angular displacement values, a plurality of rotor shaft angular velocity signals, and a plurality of rotor shaft angular acceleration signals. The method also includes determining a torsional moment within a rotor shaft. The method further includes modulating at least one of a wind turbine generator yaw orientation and a blade pitch orientation as a function of the determined torsional moment.

In another aspect, a wind turbine generator condition monitoring system is provided. The system includes a plurality of rotor shaft angular velocity sensors. The system also includes at least one processor coupled to the plurality of rotor shaft velocity sensors. The at least one processor is programmed to determine a difference between each of the plurality of rotor shaft angular velocity sensors of at least one of an angular displacement, an angular velocity, and an angular acceleration of the rotor shaft. An output of the at least one processor includes at least one of a wind turbine generator yaw orientation signal and a wind turbine generator blade pitch orientation signal.

In still another aspect, a wind turbine generator is provided. The wind turbine generator includes a rotor shaft and a condition monitoring system. The condition monitoring system includes a plurality of rotor shaft angular velocity sensors. The system also includes at least one processor coupled to the plurality of rotor shaft velocity sensors. The at least one processor is programmed to determine a difference between each of the plurality of rotor shaft angular velocity sensors of at least one of an angular displacement, an angular velocity, and an angular acceleration of the rotor shaft. An output of the at least one processor includes at least one of a wind turbine generator yaw orientation signal and a wind turbine generator blade pitch orientation signal.

DETAILED DESCRIPTION OF THE INVENTION

The method and condition monitoring system described herein facilitate operation of wind turbine generators by estimating a torque on a wind turbine rotor. Such rotor torque estimation provides indications of mass imbalances of, and increased stresses on, the wind turbine rotor that may be reduced by changes in blade pitch orientation and/or wind turbine yaw orientation. Reducing such stresses facilitates extending operational life expectancies of wind turbine drive train components.

A technical effect of the condition monitoring system and method described herein includes separating and isolating alternating torque (or oscillating torque) and constant torque (or static torque) from a free torque determination associated with a wind turbine generator. More specifically, a technical effect of the condition monitoring system and method described herein includes effectively separating free torque determinations into two components, that is, oscillating torque values and static torque values, and subsequently evaluating the static torque values. A further technical effect of evaluating the static torque values includes facilitating determination of load moments within a rotor shaft of the wind turbine generator, and facilitating control of such load moments within predetermined parameters.

Figure 1:
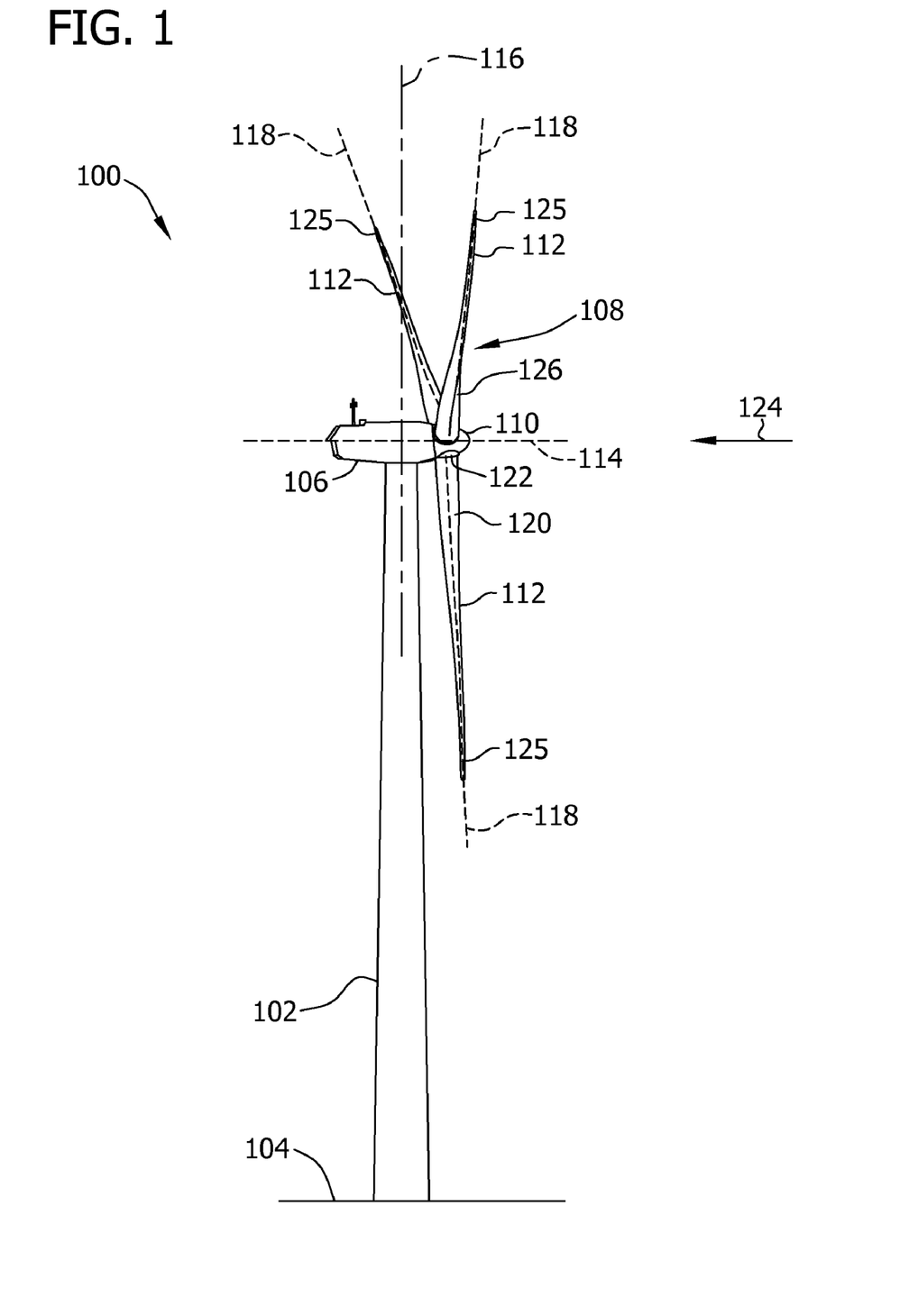
FIG. 1 is a schematic view of an exemplary wind turbine generator.

FIG. 1 is a schematic view of an exemplary wind turbine generator 100. In the exemplary embodiment, wind turbine generator 100 is a horizontal axis wind turbine. Alternatively, wind turbine 100 may be a vertical axis wind turbine. Wind turbine 100 has a tower 102 extending from a supporting surface 104 that tower 102 is coupled to by either anchor bolts or a foundation mounting piece (neither shown). A nacelle 106 is coupled to tower 102, and a rotor 108 is coupled to nacelle 106. Rotor 108 has a rotatable hub 110 and a plurality of rotor blades 112 coupled to hub 110. In the exemplary embodiment, rotor 108 has three rotor blades 112. Alternatively, rotor 108 has any number of rotor blades 112 that enables wind turbine generator 100 to function as described herein. In the exemplary embodiment, tower 102 is fabricated from tubular steel extending between supporting surface 104 and nacelle 106. Alternatively, tower 102 is any tower that enables wind turbine generator 100 to function as described herein including, but not limited to, a lattice tower. Tower 102 is any suitable height that enables wind turbine generator 100 to function as described herein.

Rotor blades 112 are positioned about rotor hub 110 to facilitate rotating rotor 108, thereby transferring kinetic energy from wind 124 into usable mechanical energy, and subsequently, electrical energy. Rotor 108 and nacelle 106 are rotated about tower 102 on a yaw axis 116 to control the perspective of rotor blades 112 with respect to the direction of wind 124. Rotor blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in rotor blades 112 are transferred to hub 110 via load transfer regions 122. Each of rotor blades 112 also includes a blade tip portion 125.

In the exemplary embodiment, rotor blades 112 have a length range of between 30 meters (m) (98 feet (ft)) and 50 m (164 ft), however these parameters form no limitations to the instant disclosure. Alternatively, rotor blades 112 may have any length that enables wind turbine generator to function as described herein. As wind 124 strikes each rotor blade 112, blade lift forces (not shown) are induced on each rotor blade 112 and rotation of rotor 108 about a rotation axis 114 is induced as blade tip portions 125 are accelerated.

A pitch angle (not shown) of rotor blades 112, i.e., an angle that determines perspective of each rotor blade 112 with respect to a direction of wind 124, may be changed by a pitch adjustment mechanism (not shown in FIG. 1). Specifically, increasing a pitch angle of rotor blade 112 decreases a blade surface area 126 exposed to wind 124 and, conversely, decreasing a pitch angle of rotor blade 112 increases blade surface area 126 exposed to wind 124. The pitch angles of rotor blades 112 are adjusted about a pitch axis 118 for each rotor blade 112. In the exemplary embodiment, the pitch angles of rotor blades 112 are controlled individually. Alternatively, rotor blades' 112 pitch may be controlled as a group.

Figure 2:
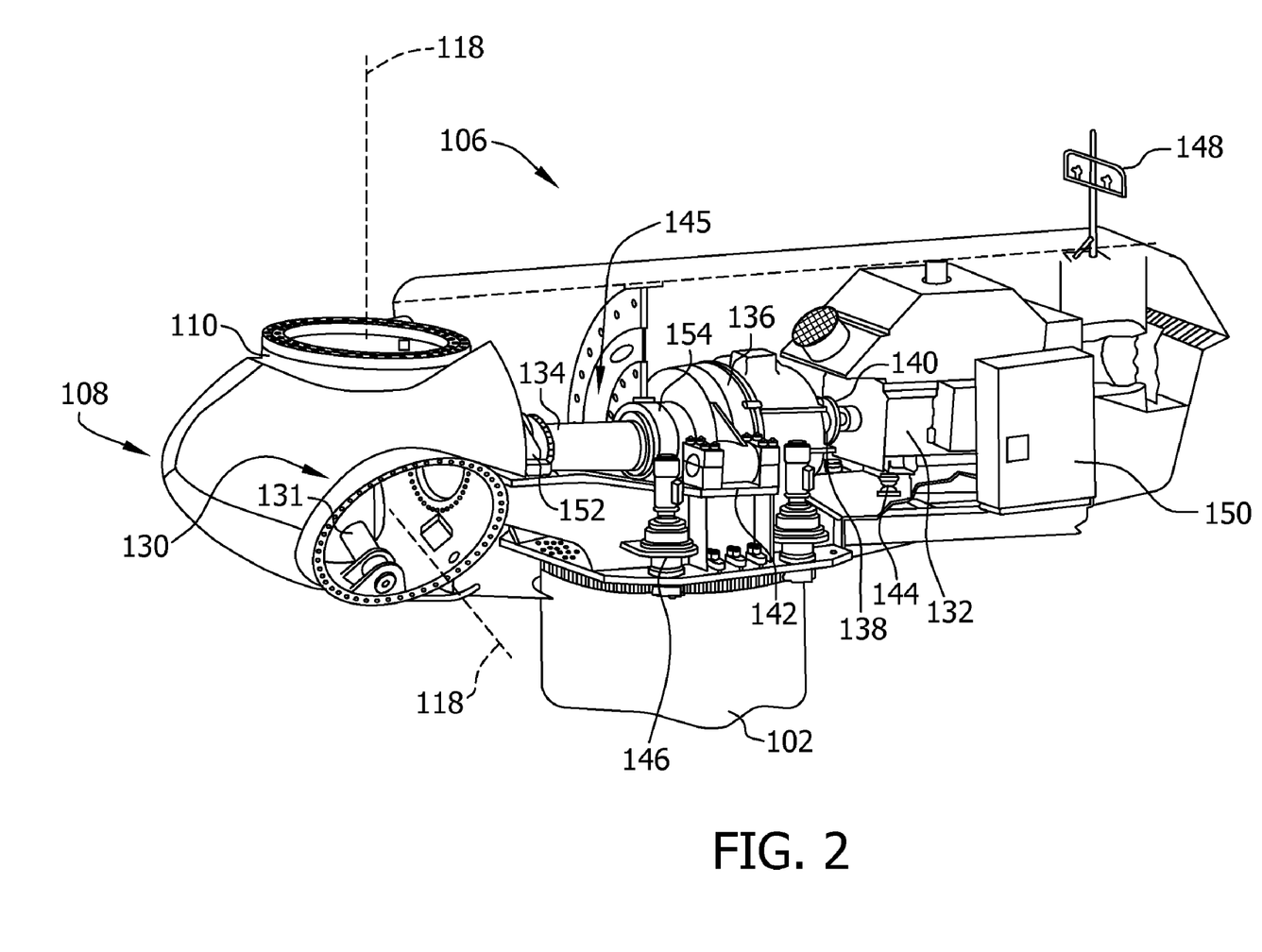
FIG. 2 is a cross-sectional schematic view of a nacelle that may be used with the wind turbine generator shown in FIG. 1.

FIG. 2 is a cross-sectional schematic view of nacelle 106 of exemplary wind turbine 100 (shown in FIG. 1). Various components of wind turbine 100 are housed in nacelle 106 atop tower 102 of wind turbine 100. Nacelle 106 includes one pitch drive mechanism 130 that is coupled to one rotor blade 112 (shown in FIG. 1), wherein pitch drive mechanism 130 modulates the pitch of associated rotor blade 112 along pitch axis 118. Only one of three pitch drive mechanisms 130 is shown in FIG. 2. In the exemplary embodiment, each pitch drive mechanism 130 includes at least one pitch drive motor 131. Pitch drive motor 131 is any electric motor driven by electrical power that enables pitch drive mechanism 130 to function as described herein. Alternatively, pitch drive mechanism 130 includes any suitable structure, configuration, arrangement, and/or components such as, but not limited to, hydraulic cylinders, springs, and/or servomechanisms. Moreover, pitch drive mechanisms 130 may be driven by any suitable means such as, but not limited to, hydraulic fluid, and/or mechanical power, such as, but not limited to, induced spring forces and/or electromagnetic forces.

Nacelle 106 also includes a rotor 108 that is rotatably coupled to an electric generator 132 positioned within nacelle 106 via rotor shaft 134 (sometimes referred to as either a main shaft or a low speed shaft), a gearbox 136, a high speed shaft 138, and a coupling 140. Rotation of shaft 134 rotatably drives gearbox 136 that subsequently rotatably drives high speed shaft 138. High speed shaft 138 rotatably drives generator 132 via coupling 140 and high speed shaft 138 rotation facilitates generator 132 production of electrical power. Gearbox 136 and generator 132 are supported by supports 142 and 144, respectively. In the exemplary embodiment, gearbox 136 utilizes a dual path geometry to drive high speed shaft 138. Alternatively, rotor shaft 134 is coupled directly to generator 132 via coupling 140.

Nacelle 106 further includes a yaw drive mechanism 146 that may be used to rotate nacelle 106 and rotor 108 on yaw axis 116 (shown in FIG. 1) to control the perspective of rotor blades 112 with respect to the direction of wind 124. Nacelle 106 also includes at least one meteorological mast 148, wherein mast 148 includes a wind vane and anemometer (neither shown in FIG. 2). Mast 148 provides information to a turbine control system (not shown) that may include wind direction and/or wind speed. A portion of the turbine control system resides within a control cabinet 150. In the exemplary embodiment, nacelle 106 further includes main, or forward and aft support bearings 152 and 154, respectively. Support bearings 152 and 154 facilitate radial support and alignment of rotor shaft 134. Forward support bearing 152 is positioned on rotor shaft 134 near hub 110. Aft support bearing 154 is positioned on rotor shaft 134 near gearbox 136 and/or generator 132. Alternatively, nacelle 106 includes any number of support bearings that enable wind turbine 100 to function as disclosed herein.

Hub 110, rotor shaft 134, generator 132, gearbox 136, high speed shaft 138, coupling 140, and any associated fastening, support, and/or securing device including, but not limited to, supports 142 and 144 and support bearings 152 and 154, are referred to as a drive train 145.

Figure 3:
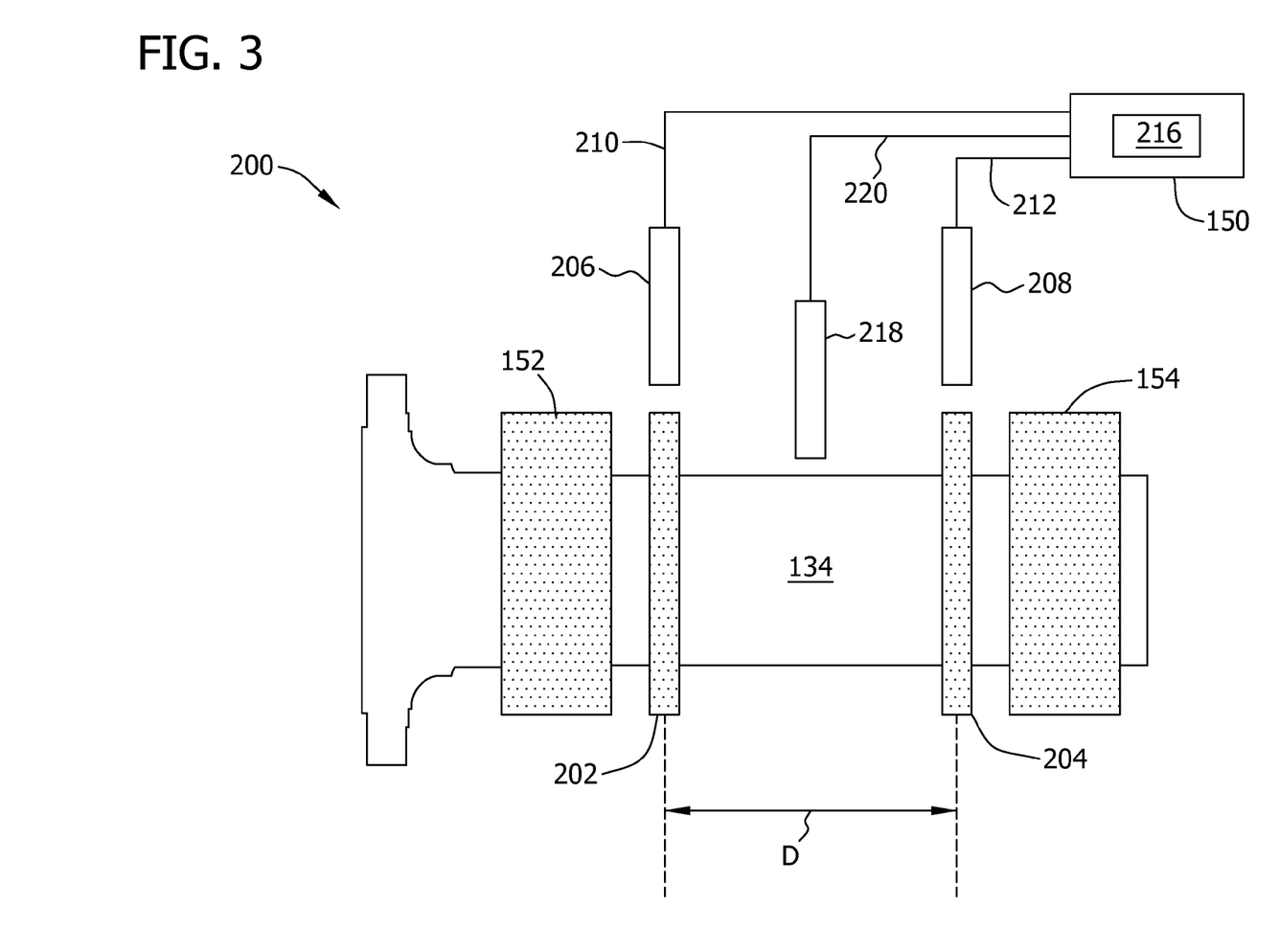
FIG. 3 is a schematic view of an exemplary condition monitoring system that may be used with the wind turbine generator shown in FIG. 1.

FIG. 3 is a schematic view of an exemplary condition monitoring system 200 that may be used with wind turbine generator 100 (shown in FIG. 1). In the exemplary embodiment, condition monitoring system 200 includes a plurality of toothed wheels, i.e., a first toothed wheel 202 and a second toothed wheel 204. In the exemplary embodiment, first toothed wheel 202 is substantially similar to second toothed wheel 204. First toothed wheel 202 is coupled to rotor shaft 134 near forward support bearing 152 and second toothed wheel 204 is coupled to rotor shaft 134 near aft support bearing 154, thereby defining a predetermined distance D between wheels 202 and 204. Condition monitoring system 200 also includes a first sensor 206 positioned radially outboard of first toothed wheel 202 and a second sensor 208 positioned radially outboard of second toothed wheel 204, wherein first sensor 206 is substantially similar to second sensor 208. First sensor 206 is coupled to control cabinet 150 via a first conduit 210 and second sensor 208 is coupled to control cabinet 150 via a second conduit 212. Condition monitoring system 200 further includes at least one linear acceleration sensor 218 coupled to control cabinet 150 via a third conduit 220.

In the exemplary embodiment, at least one of toothed wheels 202 and 204 provides an angular velocity input, as described further below, with the other of toothed wheels 202 and 204 providing at least some redundancy. Moreover, use of two toothed wheels 202 and 204 facilitates determination of load moments within rotor shaft 134 as described further below.

Figure 4:
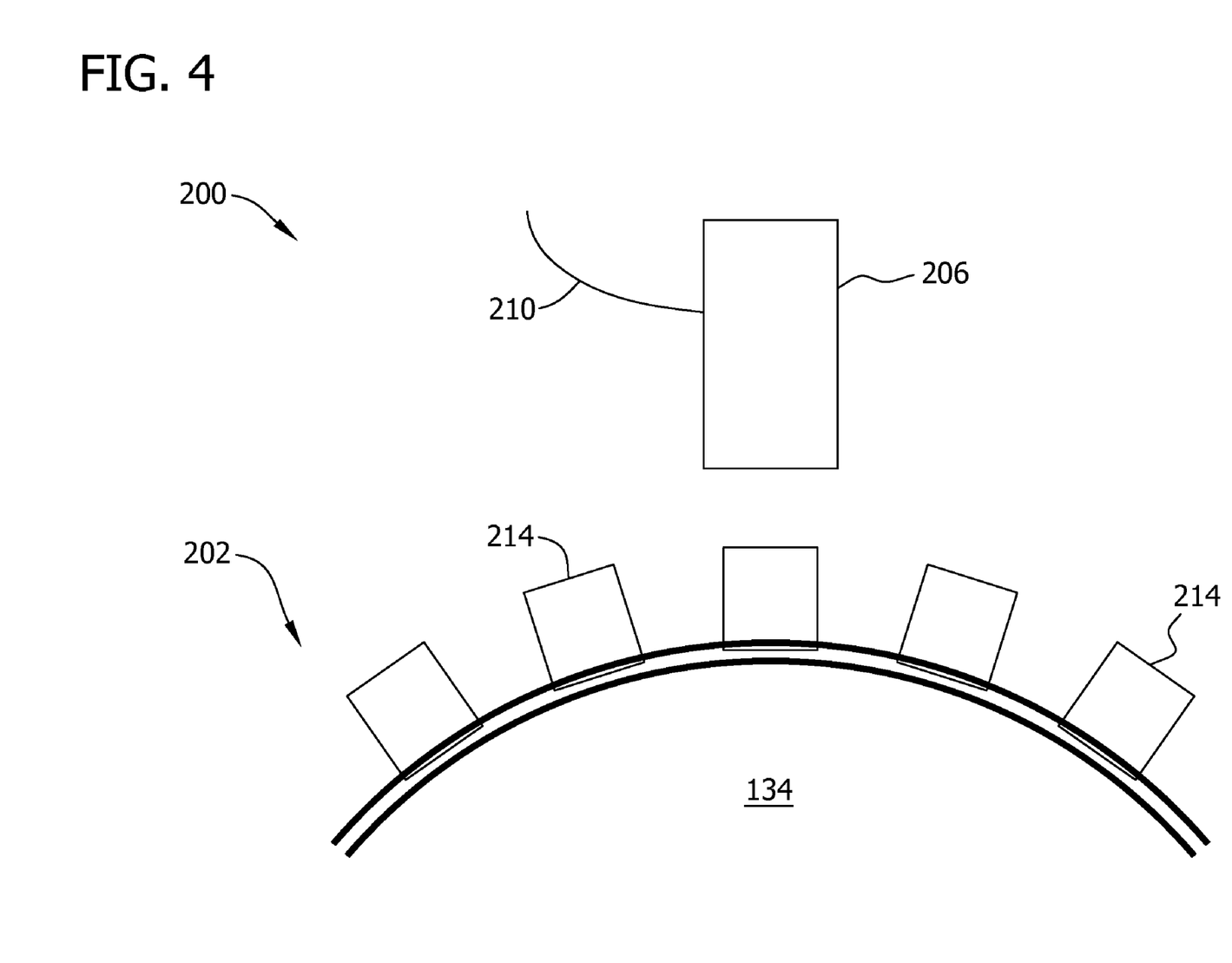
FIG. 4 is a schematic view of a portion of the condition monitoring system shown in FIG. 3.

FIG. 4 is a schematic view of a portion of condition monitoring system 200. First toothed wheel 202 includes a plurality of teeth 214. Sensor 206 generates a pulsed signal (not shown) to control cabinet 150 via first conduit 210 as each tooth 214 transits by sensor 206. In the exemplary embodiment, first toothed wheel 202 and sensor 206 cooperate to generate and transmit a high resolution angular velocity signal for rotor shaft 134. In the exemplary embodiment, sensor 206 is an induction sensor. Alternatively, sensor 206 includes, without limitation, any type of sensor that enables condition monitoring system 200 to function as described herein, including a Hall sensor and/or a light sensor.

Referring again to FIG. 3, condition monitoring system 200 includes at least one processor 216. As used herein, the term processor is not limited to integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but not be limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Processor 216 and other processors (not shown) as described herein process information transmitted from a plurality of electrical and electronic devices that may include, without limitation, sensors 206 and 208. RAM and storage devices (not shown) store and transfer information and instructions to be executed by processor 216. RAM and storage devices can also be used to store and provide temporary variables, static (i.e., non-changing) information and instructions, and/or other intermediate information to processor 216 during execution of instructions by processor 216. Instructions that are executed include, but are not limited to, resident condition monitoring system 200 control commands. The execution of sequences of instructions is not limited to any specific combination of hardware circuitry and software instructions.

In the exemplary embodiment, at least a portion of condition monitoring system 200 including, but not limited to, processor 216 is positioned within control cabinet 150. Moreover, processor 216 is coupled to blade pitch drive motors 131 and yaw drive mechanism 146 (both shown in FIG. 2) via at least one input/output (I/O) channel (not shown) having any architecture including, but not limited to, Cat 5/6 cable, twisted pair wiring, and wireless communication features. Condition monitoring system 200 may include distributed and/or centralized control architectures, or any combination thereof.

Figure 5:
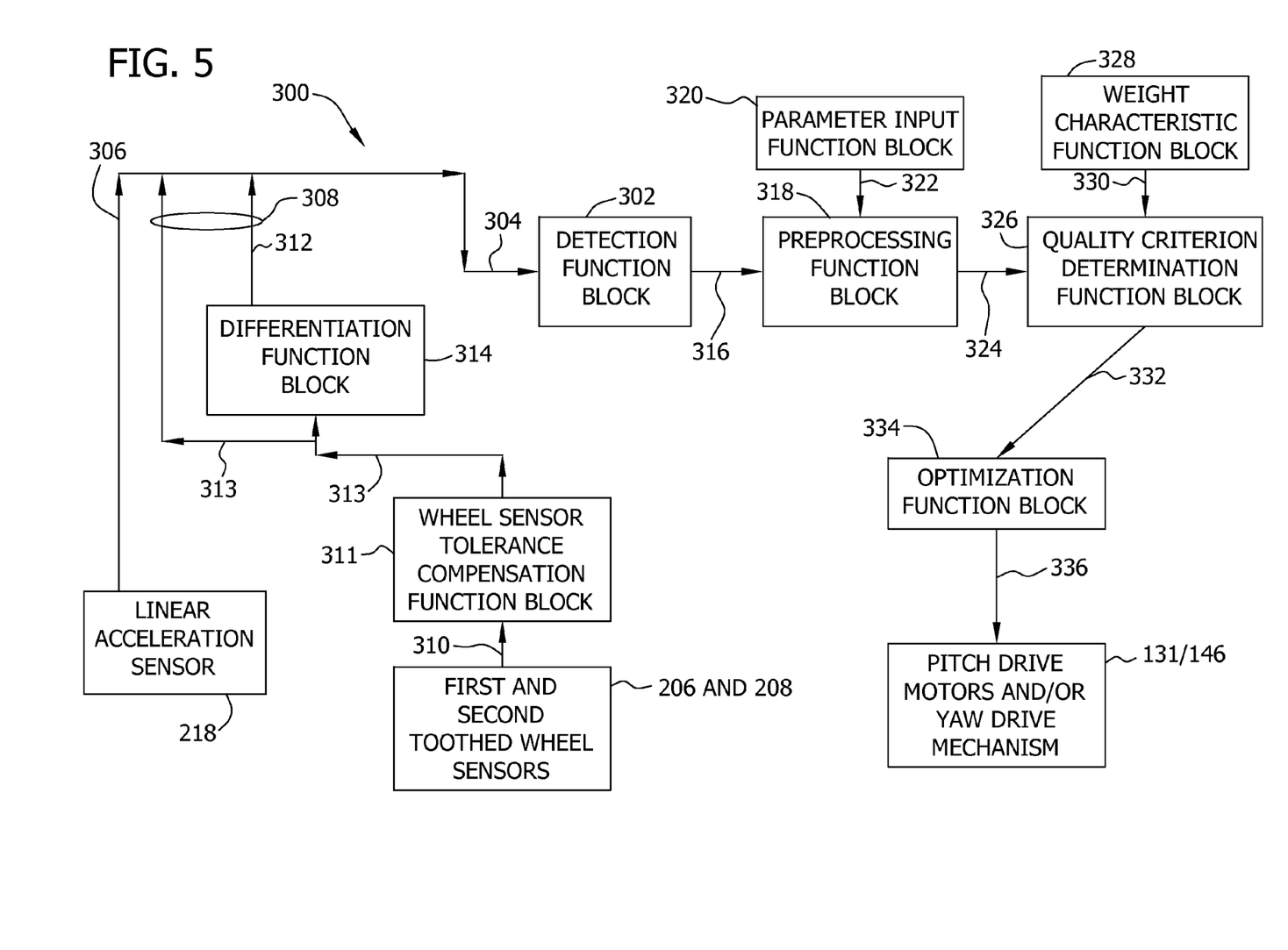
FIG. 5 is a schematic view of a condition monitoring and control strategy that may be used with the condition monitoring system shown in FIG. 3.

FIG. 5 is a schematic view of a condition monitoring and control strategy 300 that may be used with condition monitoring system 200 (shown in FIG. 3). In the exemplary embodiment, condition monitoring and control strategy 300 is programmed in processor 216 (shown in FIG. 1). Alternatively, strategy 300 is programmed in any number of processors that enables condition monitoring system 200 to function as described herein.

A technical effect of condition monitoring and control strategy 300 includes separating and isolating alternating torque (or oscillating torque) and constant torque (or static torque) from a free torque determination. "Free torque" is the product of a mass moment of inertia of a rotating mass about an axis of rotation and an observed angular acceleration. The rotating mass disclosed herein is rotor shaft 134. "Oscillating torque" is the torque associated with the oscillating rotation of rotor shaft 134. The oscillating torque is used to rotate rotor shaft 134 and generate electric power within generator 132 (shown in FIG. 2). Oscillating torque is directly proportional to an angular velocity of rotor shaft 134 and includes a sinusoidal shape. "Static torque" includes, but is not limited to, load moments within rotor shaft 134. Therefore, more specifically, a technical effect of condition monitoring and control strategy 300 includes effectively separating free torque determinations into two components, that is, oscillating torque values and static torque values, and subsequently evaluating the static torque values. A further technical effect of evaluating the static torque values includes facilitating determination of load moments within rotor shaft 134 and, moreover, facilitating control of the load moments within predetermined parameters.

Condition monitoring and control strategy 300 includes a detection function block 302 that is configured to receive a plurality of transmitted input signals 304. In the exemplary embodiment, input signals 304 include, but are not limited to, a plurality of linear acceleration signals 306 of rotor shaft 134 (shown in FIGS. 2, 3, and 4) as sensed by linear acceleration sensor 218 and transmitted as three signals 306 (illustrated as one signal in FIG. 5). Each linear acceleration signal 306 represents a linear acceleration value of rotor shaft 134 as vectored into each of the three spatial dimensions.

In the exemplary embodiment, input signals 304 include a plurality of angular speed and acceleration signals 308 of rotor shaft 134. Angular speed and acceleration signals 308 include an angular speed signal 310 of rotor shaft 134 as detected by each toothed wheel 202 and 204 (shown in FIG. 3) and associated sensors 206 and 208, respectively. In the exemplary embodiment, both angular speed signals 310 as generated by toothed wheels 202 and 204 are used as disclosed herein. At least one angular speed signal 310 as generated by one of toothed wheels 202 or 204 is transmitted for uses external to system 200, and both wheels 202 and 204 provide redundancy for such external uses.

Angular speed signal 310 is calculated by determining a measurement of throughput time, i.e., $\Delta t$ between two teeth 214 of speed sensors 206 and 208. Also, an angular speed, i.e., $\omega$ as a function of an angular position $\phi$ of rotor shaft 134 is approximated for a given tooth pitch, i.e., $\Delta \phi$. A relationship of these variables is represented by the equation:

$$\omega(\phi) = \Delta\phi / \Delta t \tag{Equation 1}$$

Further, in the exemplary embodiment, angular speed signal 310 is transmitted to a wheel sensor tolerance compensation function block 311. A technical effect of function block 311 includes isolating and removing torque determination errors from further processing, thereby minimizing erroneous compensating actions by wind turbine 100. Such errors include, but are not limited to, geometric errors induced by out-of-tolerance conditions of toothed wheels 202 and 204. Such out-of-tolerance conditions include, but are not limited to, inconsistent sizing of teeth 214, inconsistent separation between adjacent teeth 214, slippage of wheels 202 and/or 204 on rotor shaft 134, and plastic deformation of wheels 202 and/or 204. Toothed wheels 202 and 204 are the primary sources for angular velocity of rotor shaft 134. Angular velocity of shaft 134 is an important input into oscillating torque determination and free torque determination via angular acceleration determination, both as discussed above. Therefore, reducing such angular velocity errors facilitates accurate and effective control of such load moments, as discussed above, within predetermined parameters.

Function block 311 includes sufficient programming of at least one Fourier transform algorithm and/or "ideal" sinusoidal speed models, including static and/or dynamic algorithms, of rotor shaft 134. Out-of-tolerance conditions associated with toothed wheels 202 and 204 are determined and removed from further processing within condition monitoring and control strategy 300. Therefore, function block 311 transmits a compensated angular speed signal 313. For example, models of rotor shaft 134 may be determined from data measurements collected with rotor shaft 134 rotating at a substantially constant revolutions per minute (rpm) measurement. Such data measurements include, but are not limited to, precise valuations of a time period between rotation of each tooth 214 on each wheel 202 and 204 past each sensor 206 and 208, respectively. The time valuations are stored within processor 216 for comparison of instantaneous measurements of rotor shaft 134 under transient rpm conditions. Compensation determinations between such instantaneous measurements of time between rotation of each tooth 214 are facilitated.

Further, variations of torque of rotor shaft 134 due to circumstances that include, but are not limited to, wind shear, i.e., variations of wind direction and magnitude as a function of height, are evaluated. Such wind shear conditions induce torque variations having oscillations of one period for each blade 112 (shown in FIGS. 1 and 2) per each 360° rotation of rotor shaft 134, assuming approximately equal pitch angles for each blade 112 about pitch axis 118 (shown in FIGS. 1 and 2). If the pitch angles about axes 118 for each blade 112 are not approximately equal to each other, an additional periodic torque variation once per 360° rotation of rotor shaft 134 will be heterodyned, i.e., combined with the periodic torque variations, or torque oscillations as described above, to induce an additional torque oscillation in rotor shaft 134. Additional factors that are used to determine proportional values of each oscillation of torque include, but are not limited to, known values of concentricity and aerodynamic imbalance of rotor shaft 134. Therefore, measurement of such torque oscillations as applied to angular acceleration facilitates determining overall mass imbalance determinations as described herein. Furthermore, such methods of determining variations in angular acceleration as a function of oscillations of rotor shaft 134 can be applied to linear acceleration determinations associated with such mass imbalances using similar principles.

In the exemplary embodiment, two types of imbalance are analyzed, that is, aerodynamic imbalance and mass imbalance. Aerodynamic imbalance is induced by wind shear with unequal pitch angles of individual rotor blades 118 as described above. Such unequal pitch angles induce unequal forces on rotor blades 118 that vary with wind velocity gradients of wind shear. Such unequal forces induce torque fluctuations within one revolution of rotor shaft 134. Such torque fluctuations induce reciprocating angular speed fluctuations, such angular speed fluctuations measured as described herein.

Mass imbalance is induced by unequal masses and/or mass distributions in each rotor blade 118. As opposed to aerodynamic imbalance, mass imbalance does not induce asymmetric loads on rotor shaft 134. Rather, reaction forces are induced that are transferred into drive train 145 (as shown in FIG. 2). Such mass imbalance can be measured by tri-axial linear acceleration sensor 218. A vertical component of such forces induced by mass imbalance can be neglected due to a high stiffness of tower 102 (shown in FIGS. 1 and 2) in an axial direction, that is, vertical dimension such that acceleration sensor 218 may be configured for the two remaining dimensions. Indices for each of aerodynamic imbalance and mass imbalance are determined with algorithms that include, but are not limited to, Fourier transform algorithms. Such indices are used to facilitate turbine control and optimization.

Angular speed and acceleration signals 308 also include an angular acceleration signal 312 of rotor shaft 134, wherein angular acceleration signal 312 represents compensated angular speed signal 313 differentiated by a differentiation function block 314. More specifically, Equation (1) (shown above) for angular speed as a function of angular position of rotor shaft 134, or $\omega(\phi)$ is differentiated to determine angular acceleration as a function of angular position of rotor shaft 134, or $\alpha(\phi)$ to form a relationship as represented by the equation:

$$\alpha(\phi)=(d\omega/d\phi)*(d\Phi/dt)\approx(\Delta\omega/\Delta\phi)*(\Delta\omega/\Delta t)=(\Delta\omega/\Delta\phi)*\omega \quad \text{(Equation 2)}$$

In the exemplary embodiment, detection function block 302 performs at least three functions. A first function of function block 302 is data acquisition, wherein function block 302 receives signals 304. Input signals 304 are analog signals. A second function of function block 302 is to perform as a collector of input signals 304. Analog input signals 304 are collected in preparation for conversion to digital signals. A third function of function block 302 is analog-to-digital signal conversion. Analog signals 304 are converted to digital signals 316, wherein digital signals 316 represent linear acceleration values in each of the three spatial dimensions and angular velocity and acceleration of rotor shaft 134.

Condition monitoring and control strategy 300 also includes a preprocessing function block 318 coupled with detection function block 302, wherein preprocessing function block 318 receives digital signals 316 transmitted by detection function block 302. Condition monitoring and control strategy 300 further includes a parameter input function block 320 coupled with preprocessing function block 318. Parameter input function block 320 generates a plurality of signal smoothing and filtering signals 322 and transmits smoothing and filtering signals 322 to preprocessing function block 318. Parameter input function block 320 stores a plurality of signal averaging algorithms and high-pass sand low-pass signal filtering algorithms that are used within preprocessing function block 318 to reduce potential errors that may be introduced into condition monitoring system 200 by short-term transients, system noise, clearances and tolerances of support bearings 152 and 154 (both shown in FIGS. 2 and 3), and erroneous signals generated by sensors 206, 208, and/or 218.

Preprocessing function block 318 includes sufficient programming to determine an instantaneous static torque valuation of rotor shaft 134 as described above. In the exemplary embodiment, preprocessing function block 318 receives digital signals 316 transmitted by detection function block 302. Moreover, preprocessing function block 318 receives filtering and smoothing signals 316 from parameter input function block 320. Therefore, preprocessing function block 318 performs smoothing and filtering operations on digital signals 316.

As discussed above, digital signals 316 include rotational, or angular velocity information from each toothed wheel 202 and 204, and associated sensors 206 and 208, respectively. More specifically, toothed wheel 202 and sensor 206 measure an angular velocity of rotor shaft 134 in a vicinity of forward support bearing 152. Further, toothed wheel 204 and sensor 208 measure an angular velocity of rotor shaft 134 in a vicinity of aft support bearing 154. Rotor shaft 134 is assumed to be sufficiently rigid with established material properties that include known torsional deformation as a function of known torsional moments, wherein such properties are programmed within processor 216. Therefore, under transient conditions, that is, when measured angular acceleration of rotor shaft 134 is a non-zero value, torsional moments induced within rotor shaft 134 facilitate small, finite torsional deformations of rotor shaft 134. Such torsional deformations are manifested as small, measured, angular displacements of toothed wheels 202 and 204 from each other and associated angular speed signals 310. Such angular displacements are proportional to differences between angular speed signals 310 transmitted by toothed wheels 202 and 204, in conjunction with predetermined distance D (shown in FIG. 3) between toothed wheels 202 and 204. Moreover, such angular displacements are directly proportional to associated torsional deformations that are directly proportional to torsional moments, wherein such moments are directly proportional to instantaneous static torques within rotor shaft 134. Preprocessing function block 318 includes sufficient programming including, but not limited to, at least one Fourier transform algorithm, to determine an instantaneous static torque valuation of rotor shaft 134 as described above. Therefore, preprocessing function block 318 generates a digital static torque signal 324.

Condition monitoring and control strategy 300 also includes a quality criterion determination function block 326 coupled with preprocessing function block 318. Condition monitoring and control strategy 300 further includes a weight characteristic function block 328 that includes sufficient programming to either automatically, or under manual direction, determine a mode of operation of condition monitoring and control strategy 300 out of two possible modes, i.e., "minimize component wear mode" and "maximize electric power generation mode." The "minimize component wear mode" facilitates decreasing wear on components of drive train 145 over increasing electric power generation of generator 132. The "maximize electric power generation mode" facilitates increasing electric power generation of generator 132 over decreasing wear on components of drive train 145. For example, during initial power generation ramp-up of wind turbine 100, the "maximize electric power generation mode" is typically selected. Therefore, weight characteristic function block 328 transmits a discrete mode selection signal 330 to quality criterion determination function block 326.

Quality criterion determination function block 326 includes sufficient programming to receive digital static torque signal 324 from preprocessing function block 318 and discrete mode selection signal 330 from weight characteristic function block 328 and determine specific quality criteria of wear and energy production that includes, but is not limited to, electric power generation parameters. Quality criterion determination function block 326 generates a wear and energy production signal 332.

Condition monitoring and control strategy 300 also includes an optimization function block 334 coupled in communication with quality criterion determination function block 326. Optimization function block 334 includes sufficient programming to receive wear and energy production signal 332 and generate a plurality of device positioning signals 336. Signals 336 include blade pitch angle determinations and azimuth angle determinations. Signals 336 are transmitted to appropriate pitch drive motors 131 and yaw drive mechanism 146, wherein signals 336 have values consistent with the selected mode of operation as described above.

In operation of wind turbine generator 100 (shown in FIGS. 1 and 2), and associated condition monitoring system 200 (shown in FIGS. 3, 4, and 5), including condition monitoring and control strategy 300, wind 124 (shown in FIG. 1) impinges upon each rotor blade 112 (shown in FIG. 1), thereby inducing a rotational motive force on hub 110 (shown in FIGS. 1 and 2) that is transferred to drive train 145 (shown in FIG. 2), wherein rotor shaft 134 rotates and generator 132 (both shown in FIG. 2) generates electric power. Rotation of rotor shaft 134 induces rotation in each toothed wheel 202 and 204 (both shown in FIGS. 3, 4, and 5), thereby generating angular speed signals 310. Angular speed signals 310 are compensated by wheel sensor tolerance compensation function block 311 to generate compensated angular speed signals 313. At least a portion of compensated angular speed signals 313 are differentiated via differentiation function block 314 to generate angular acceleration signals 312. Compensated angular speed signals 313 and angular acceleration signals 312 are transmitted to detection function block 302 as input signals 304, wherein analog input signals 304 are converted to digital signals 316. Digital signals 316 are transmitted to preprocessing function block 318, wherein digital signals 316 facilitate generating digital static torque signals 324. Digital static torque signals 324 are substantially representative of torsional moments induced within rotor shaft 134.

Moreover, in operation of wind turbine generator 100 and condition monitoring system 200, including condition monitoring and control strategy 300, static torque signals 324 are transmitted to quality criterion determination function block 326, wherein one of two possible modes of operation is selected. Quality criterion determination function block 326 generates a wear and energy production signals 332 that includes control signals associated with the selected mode of operation. Wear and energy production signals 332 are transmitted to optimization function block 334 that generates a plurality of device positioning signals 336. Device positioning signals 336 include blade pitch angle determinations and azimuth angle determinations. Device positioning signals 336 are transmitted to appropriate pitch drive motors 131 and yaw drive mechanism 146. Device positioning signals 336 have values consistent with the selected mode of operation as described above.

During initial power generation ramp-up of wind turbine 100, the "maximize electric power generation mode" is typically selected within condition monitoring and control strategy 300 of condition monitoring system 200. Therefore, device positioning signals 336 are transmitted to appropriate pitch drive motors 131 and yaw drive mechanism 146 to facilitate wind turbine 100 attaining a desired electric power generation. During such startups, minimization of component wear is a lower priority as compared to maximizing electric power generation.

Minimizing component wear may be a higher priority than maximizing electric power generation with wind turbine generator 100 generating electric power at or near rated capacity, for example. In the event of unplanned environmental conditions that include, but are not limited to, ice formation on one or more rotor blades 112 and/or wind 124 including an inclined stream component, the "minimize component wear mode" is typically selected within condition monitoring and control strategy 300 of condition monitoring system 200. Therefore, device positioning signals 336 are generated as a function of estimated torsional moments and static torque within rotor shaft 134, and device positioning signals 336 are transmitted to appropriate pitch drive motors 131 and yaw drive mechanism 146 to facilitate wind turbine 100 maintaining loading on rotor shaft 134 within desired parameters.

Figure 6:
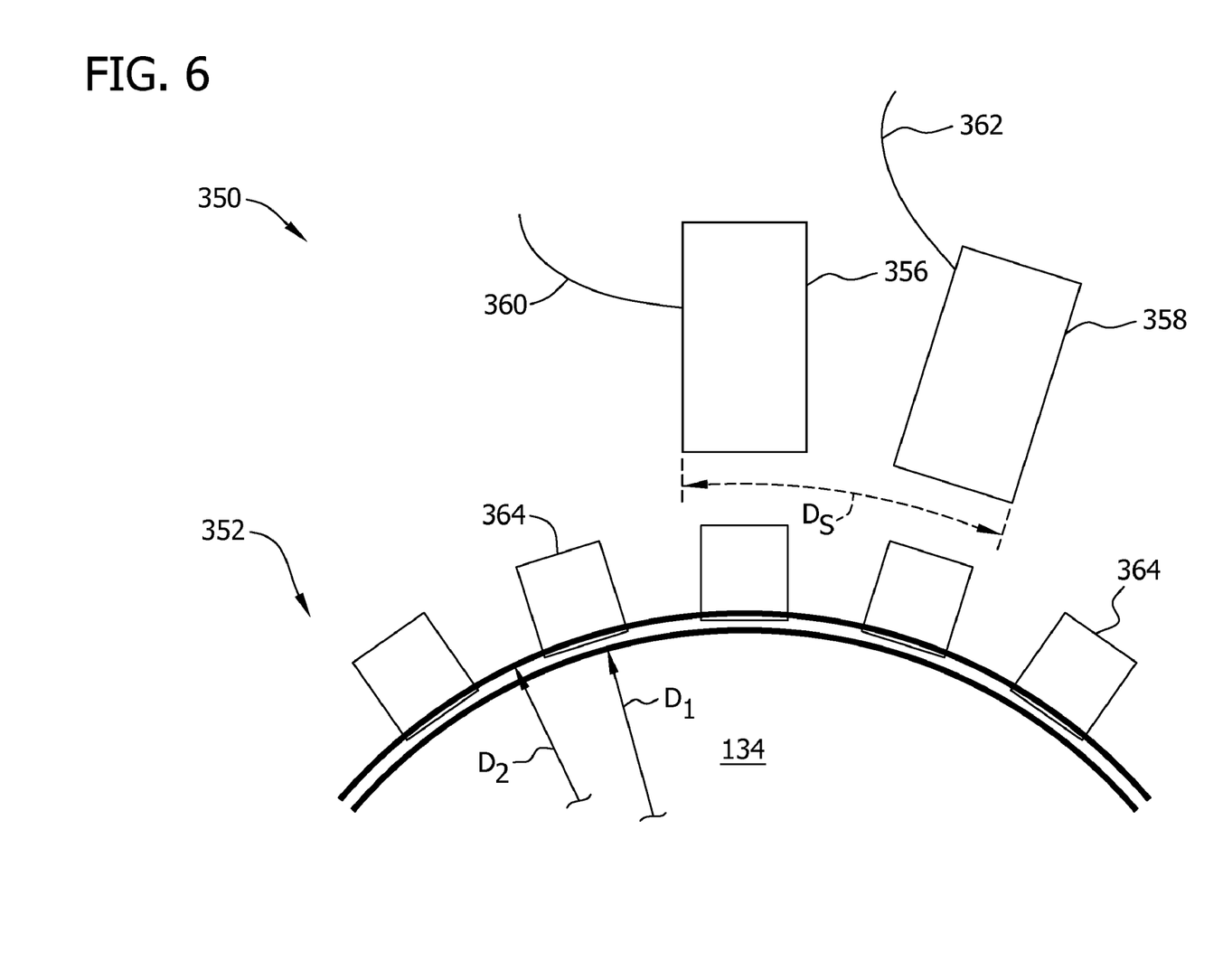
FIG. 6 is a schematic view of a portion of an alternative condition monitoring system that may be used with the condition monitoring and control strategy shown in FIG. 5; and, FIG. 7 is a flow chart of an exemplary method of operating the wind turbine generator shown in FIG. 1.

FIG. 6 is a schematic view of a portion of an alternative condition monitoring system 350 that may be used with condition monitoring and control strategy 300 (shown in FIG. 5). Condition monitoring system 350 is similar to condition monitoring system 200 (shown in FIGS. 3 and 4) with the exceptions described below. A toothed wheel 352 that is similar to toothed wheel 202 (shown in FIGS. 3 and 4) is coupled to rotor shaft 134 and includes a plurality of teeth 364. Rotor shaft 134 is a hollow shaft defining an inner diameter $D_1$ and an outer diameter $D_2$. Condition monitoring system 350 also includes a first sensor 356 positioned radially outboard of toothed wheel 352. Condition monitoring system 350 further includes a second sensor 358 positioned radially outboard of toothed wheel 352 and circumferentially adjacent to first sensor 356. In one embodiment, first sensor 356 is substantially similar to second sensor 358. Sensors 356 and 358 are positioned within a circumferential distance $D_S$. First sensor 356 is coupled to control cabinet 150 (shown in FIGS. 2 and 3) via a first conduit 360 and second sensor 358 is coupled to control cabinet 150 via a second conduit 362.

First sensor 356 and second sensor 358 each generate a pulsed signal (not shown) to control cabinet 150 via first conduit 360 and second conduit 362, respectively, as each tooth 364 transits by sensors 356 and 358, respectively. In this alternative embodiment, toothed wheel 352 and sensors 356 and 358 cooperate to generate and transmit high resolution angular velocity signals associated with rotation of rotor shaft 134. In this alternative embodiment, sensors 356 and 358 are any rotary encoders, without limitation, that enable condition monitoring system 350 to function as described herein.

First sensor 356 and second sensor 358 cooperate to determine a torsion angle $\phi$ that is subsequently used to determine a torque M as represented by the equation:

$$M = \pi * [(D_2^4 - D_1^4) * G] * (\phi - \phi_0(32 * D_S)) \quad \text{(Equation 3)}$$

wherein G represents the shear modulus of the material of rotor shaft 134 and $\phi_0$ represents a zero-torsion angle that is determined under no-load conditions. Condition monitoring system 350 facilitates determining root causes of significant deviations of $\phi$ from $\phi_0$ that include, but are not limited to, damage to one or more rotor blades 118 and/or excessive pitch adjustment. Moreover, positioning multiple iterations of condition monitoring system 350 along drive train 145 (shown in FIG. 2) with components that include, but are not limited to, hub 110, gearbox 136, and generator 132 (all shown in FIG. 2) facilitates monitoring the energy transfer process from hub 110 to generator 132 as well as operation of such components of drive train 145.

Figure 7:
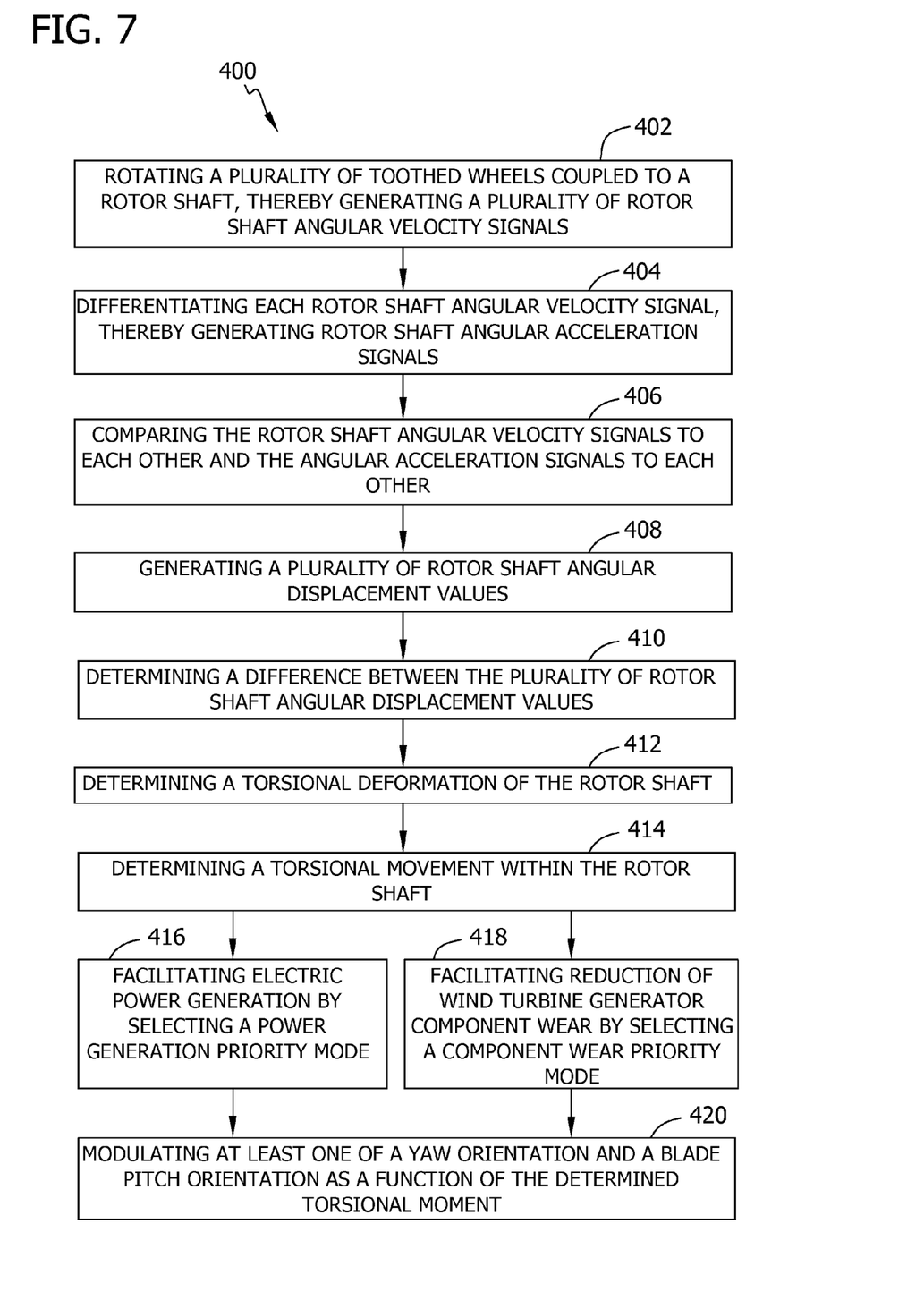

FIG. 7 is a flow chart of an exemplary method 400 of operating wind turbine generator 100 (shown in FIG. 1). Method 400 includes rotating 402 plurality of toothed wheels 202 and 204 coupled to rotor shaft 134, thereby generating plurality of rotor shaft angular velocity signals 313. Method 400 also includes differentiating 404 each rotor shaft angular velocity signal 313, thereby generating rotor shaft angular acceleration signals 312. Method 400 further includes comparing 406 a plurality of rotor shaft angular velocity signals 313 to each other and a plurality of angular acceleration signals 312 to each other. Method 400 also includes generating 408 a plurality of rotor shaft angular displacement values based on the rotor shaft angular velocity comparisons and/or the angular accelerations performed above. Method 400 further includes determining 410 a difference between the plurality of rotor shaft angular displacement values. Method 400 also includes determining 412 a torsional deformation of rotor shaft 134 as a function of the difference between the plurality of rotor shaft angular displacement values. Method 400 further includes determining 414 a torsional moment within rotor shaft 134 as a function of the torsional deformation of rotor shaft 134.

Method 400 also includes facilitating 416 electric power generation by selecting a power generation priority mode, thereby facilitating electric power generation of wind turbine generator 100 in contrast to decreasing wear on wind turbine generator components. Alternatively, method 400 further includes facilitating 418 reduction of wind turbine generator component wear by selecting a component wear priority mode, thereby facilitating decreasing wear on wind turbine generator components in contrast to electric power generation of wind turbine generator 100. Method 400 also includes modulating 420 a yaw orientation and/or a blade pitch orientation of wind turbine generator 100 as a function of the determined torsional moment.

The above-described method and condition monitoring system described herein facilitate operation of wind turbine generators by estimating a torque on a wind turbine rotor. Such rotor torque estimation provides indications of increased stresses on the wind turbine rotor that may be reduced by changes in blade pitch orientation and/or wind turbine yaw orientation. Reducing such stresses facilitates extending operational life expectancies of wind turbine drive train components.

Exemplary embodiments of condition monitoring systems and methods of operating a wind turbine generator are described above in detail. The method and condition monitoring systems are not limited to the specific embodiments described herein, but rather, components of condition monitoring systems and/or steps of the methods may be utilized independently and separately from other components and/or steps described herein. For example, the methods may also be used in combination with other wind turbine generators, and are not limited to practice with only the wind turbine generator as described herein. Rather, the exemplary embodiment can be implemented and utilized in connection with many other wind turbine generator applications.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine generator, said method comprising:
   generating a plurality of rotor shaft angular displacement values by rotating a plurality of toothed wheels coupled to a rotor shaft;
   determining a torsional moment within the rotor shaft; and,
   modulating at least one of a wind turbine generator yaw orientation and a blade pitch orientation as a function of the determined torsional moment.

2. A method in accordance with claim 1, wherein modulating at least one of a wind turbine generator yaw orientation and a blade pitch orientation as a function of the determined torsional moment comprises one of:
   facilitating electric power generation; and,
   facilitating reduction of wind turbine generator component wear.

3. A method in accordance with claim 2, wherein facilitating electric power generation comprises selecting a power generation priority mode, thereby favoring electric power generation of the wind turbine generator in contrast to decreasing wear on wind turbine generator components.

4. A method in accordance with claim 2, wherein facilitating reduction of wind turbine generator component wear comprises selecting a component wear priority mode, thereby favoring decreasing wear on wind turbine generator components in contrast to electric power generation of the wind turbine generator.

5. A method in accordance with claim 1 further comprising:
generating a plurality of rotor shaft angular velocity signals;
differentiating each of the plurality of rotor shaft angular velocity signals, thereby generating a plurality of rotor shaft angular acceleration signals; and,
comparing at least one of the plurality of rotor shaft angular velocity signals to each other and the plurality of angular acceleration signals to each other.

6. A method in accordance with claim 5, wherein comparing at least one of the plurality of rotor shaft angular velocity signals to each other and the plurality of angular acceleration signals to each other comprises generating the plurality of rotor shaft angular displacement values.

7. A method in accordance with claim 6, wherein determining a torsional moment within a rotor shaft comprises:
determining a difference between the plurality of rotor shaft angular displacement values; and,
determining a torsional deformation of the rotor shaft.

8. A wind turbine generator condition monitoring system comprising:
a plurality of rotor shaft angular velocity sensors, each of said plurality of rotor shaft angular velocity sensors coupled to a rotor shaft at a predetermined distance and comprising a plurality of teeth having a predetermined size and a predetermined spacing therebetween; and,
at least one processor coupled to said plurality of rotor shaft velocity sensors, said at least one processor programmed to determine an angular displacement of the rotor shaft as a function of a difference between each of said plurality of rotor shaft angular velocity sensors, an output of said at least one processor including at least one of a wind turbine generator yaw orientation signal and a wind turbine generator blade pitch orientation signal.

9. A wind turbine condition monitoring system in accordance with claim 8, wherein said at least one processor is programmed to determine a predetermined mode of operation.

10. A wind turbine condition monitoring system in accordance with claim 9, wherein said predetermined mode of operation comprises at least one of:
a power generation priority mode; and,
a component wear priority mode.

11. A wind turbine condition monitoring system in accordance with claim 10, wherein said power generation priority mode facilitates electric power generation of the wind turbine generator in contrast to decreasing wear on wind turbine generator components.

12. A wind turbine condition monitoring system in accordance with claim 10, wherein said component wear priority mode facilitates decreasing wear on wind turbine generator components in contrast to electric power generation of the wind turbine generator.

13. A wind turbine generator comprising:
a rotor shaft; and,
a condition monitoring system comprising:
a plurality of rotor shaft angular velocity sensors, each of said plurality of rotor shaft angular velocity sensors coupled to said rotor shaft at a predetermined distance and comprising a plurality of teeth having a predetermined size and a predetermined spacing therebetween; and,
at least one processor coupled to said plurality of rotor shaft velocity sensors, said at least one processor programmed to determine an angular displacement of the rotor shaft as a function of a difference between each of said plurality of rotor shaft angular velocity sensors, an output of said at least one processor including at least one of a wind turbine generator yaw orientation signal and a wind turbine generator blade pitch orientation signal.

14. A wind turbine generator in accordance with claim 13, wherein said at least one processor is programmed to determine a predetermined mode of operation.

15. A wind turbine generator in accordance with claim 14, wherein said predetermined mode of operation comprises at least one of:
a power generation priority mode; and,
a component wear priority mode.

16. A wind turbine generator in accordance with claim 15, wherein said power generation priority mode facilitates electric power generation of the wind turbine generator in contrast to decreasing wear on wind turbine generator components.

17. A wind turbine generator in accordance with claim 15, wherein said component wear priority mode facilitates decreasing wear on wind turbine generator components in contrast to electric power generation of the wind turbine generator.

18. A wind turbine generator in accordance with claim 13, further comprising:
a plurality of blade pitch drive mechanisms configured to receive the wind turbine generator blade pitch orientation signal; and,
a yaw drive mechanism configured to receive the wind turbine generator yaw orientation signal.

* * * * *